May 30, 1933.  J. J. POWERS  1,911,924
PERAMBULATOR
Filed Sept. 5, 1931

INVENTOR.
Joseph J. Powers.
BY
ATTORNEY

Patented May 30, 1933

1,911,924

UNITED STATES PATENT OFFICE

JOSEPH J. POWERS, OF ROOSEVELT, NEW YORK, ASSIGNOR OF ONE-TWENTIETH TO WILLIAM J. STEELE, OF BALDWIN, NEW YORK

PERAMBULATOR

Application filed September 5, 1931. Serial No. 561,533.

My invention relates to hand propelled vehicles and more particularly to baby carriages or perambulators.

In an application filed May 18, 1931, Serial Number 538,207, there is disclosed a perambulator in which means is provided for raising and lowering the body of the vehicle relatively to the ground. In perambulators thus constructed it is possible to approach, and proceed up and over a curb or other obstruction without tilting or inclining either the body of the vehicle or the chassis to which the body is attached.

The present invention aims to accomplish exactly the same results as those set forth in said pending application. It is designed and intended to operate upon the same basic principle. Instead, however, of utilizing the rear axle of the running gear as a fulcrum about which the frame, when raising and lowering the body of the vehicle, is rocked, said frame is supported by and is adapted to fulcrum about an axis passing through the centers of rotation of two wholly independent and relatively small wheels or casters carried by and movable with the frame itself. The main rear axle of the perambulator is under no circumstances displaced relatively to the running gear of which said axle is an essential part. In other words, the frame, instead of being carried across and over the main rear axle, is carried across and beneath said axle and has fastened thereto the auxiliary or caster wheels, the latter, as distinguished from the main rear wheels, acting as the vehicle support during that period of operation in which the body or chassis, and hence the main wheels, are raised out of contact with the ground.

The principal advantages of such an arrangement are that the structure of the conventional perambulator need not be altered or modified and that the device of the invention may be manufactured and sold as a perambulator accessory readily attachable to perambulators now in use. Other advantages such as low manufacturing cost, etc., are obvious.

In the drawing, wherein like reference characters denote like or corresponding parts:

Figure 1:
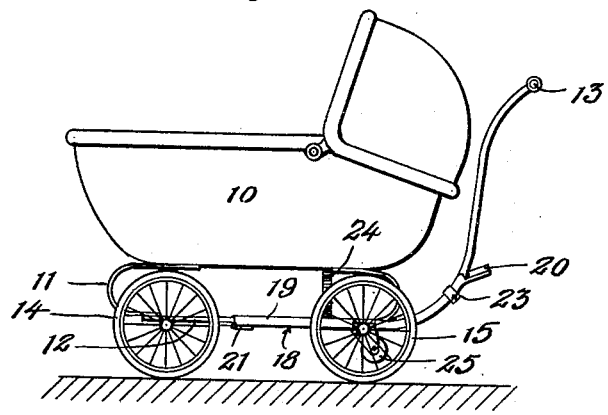
Fig. 1 is a side elevation of an ordinary perambulator with the device of my invention thereto attached.
Figure 2:
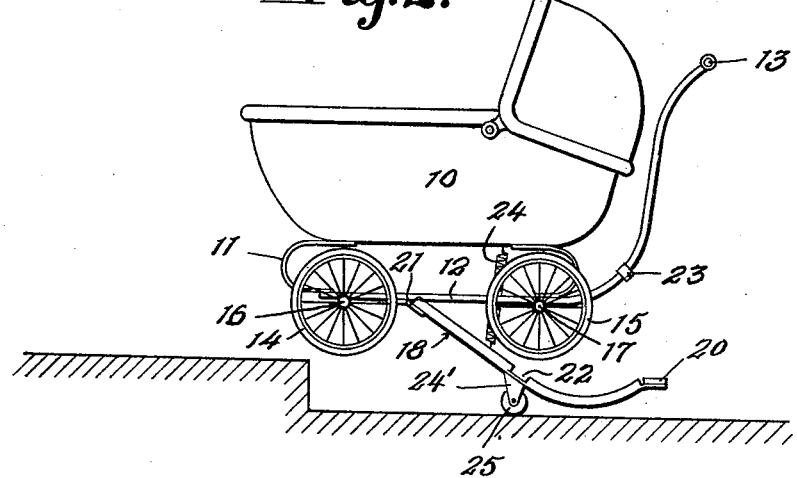
Fig. 2 is a similar view, showing the device depressed and the perambulator body raised out of contact with the ground.
Figure 3:
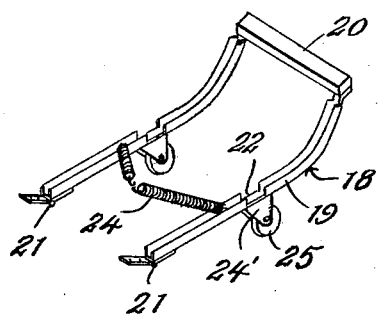
Fig. 3 is a perspective view of the attachment.

The perambulator illustrated comprises the usual body 10, springs 11, longitudinally extending gear frame 12, handle 13, front wheels 14 and rear wheels 15. The wheels 14 and 15 are mounted on axles 16 and 17, respectively, and the axles 16 and 17 are fastened in the usual manner to the gear frame 12.

The attachment per se is designated in its entirety as 18. Structurally, it is generally similar to the so-called "auxiliary" chassis referred to in said pending application. It comprises two longitudinally extending side frame members 19 inter-connected at one end by a pedal-like cross frame member 20. The side frame members 19, at their forward ends, are fastened (as by screws, bolts or the like) to the gear frame 12 by suitable hinge attachment fittings 21. Preferably, the points of attachment are disposed slightly forward of a plane passing vertically through the center of gravity of the vehicle.

As set forth in said earlier filed application, the side frame members 19 are of channel section, each at its point of inter-section with the rear axle 17 being notched as at 22. Thus constructed the side frame members 19, with the attachment 18 in the position indicated in Fig. 1, receive within the channels thereof the coextensive portions of the gear frame 12. Spring clips 23 carried by the gear frame 12 hold the attachment 18 in its collapsed or retracted position, whereas one or more springs 23 fastened to the attachment and to the gear frame, hold the former collapsed. By exerting pressure on the pedal 20 the attachment is extended to thus proportionally elevate or raise the gear frame and hence the body of the vehicle.

Both the front and rear axles of the vehicle are fastened to the gear frame 12. The attachment, when retracted, extends across, beyond and beneath the rear axle, and in its fully retracted position the rear axle fits within the notches 22 formed in the side frame members 19.

To provide an effective fulcrum for the side frame members 19, each said member has fastened thereto a depending leg or extension 24. At their outer ends said extensions 24' have mounted thereon auxiliary or caster wheels 25. These wheels 25 do not ordinarily make contact with the ground. It is only when the attachment is extended or depressed that ground contact is established. Contact having been once established, the auxiliary wheels provide a suitable fulcrum about which the attachment 28 can be rocked or pivoted to elevate the gear frame 12 and hence the body 10 by the continued or increased pressure on the pedal 20. In this manner the perambulator is bodily elevated to ride freely over an obstruction, the auxiliary wheels 25 all the while providing wheel contact with the ground. To admit of a sufficient elevation of the frame 12, the attachment 18 is preferably curved upwardly at its pedal end. The casters 25, moreover, are preferably so related to the side frame members 19 as to give with minimum pressure, maximum lift to the gear frame 12.

From the foregoing, it is obvious that no modification whatsoever is required of standardized designs of perambulators to admit of the attachment being applied; and that once applied, the perambulator may be raised and lowered without any action whatsoever on the part of the operator other than the application and removal of foot pressure on the pedal 20.

It is to be understood that the above described embodiments of the invention are for the purpose of illustration only, and various changes may be made therein without departing from the spirit and scope of the invention.

I claim as my invention:

1. The combination with a perambulator comprising a supporting gear including front and rear axles and main supporting wheels therefor, of an attachment including a frame adapted for fitting engagement close up against the under side of said supporting gear, said frame at its rearward end being extended beneath and rearwardly beyond said rear axle, and said frame at its opposite end being pivotally fastened to said supporting gear, and auxiliary wheels carried by said frame intermediately of its ends and about the axes of which said frame is adapted to rock when depressed from its normal raised position close up against said rear axle to its extended position at an angle to said supporting gear, said frame by reason of its movement as aforesaid being adapted to assist in bodily raising the main supporting wheels out of contact with the surface upon which the perambulator is supported.

2. In a perambulator, a longitudinally extending supporting gear, a transversely extending front axle upon which said supporting gear is mounted at its forward end, a transversely extending rear axle upon which said supporting gear is mounted at its rearward end, main supporting wheels carried by said axles, a movable frame having a pivotal connection at its forward end with said supporting gear, said pivotal connection lying intermediately of said front and said rear axles, and said frame at its rearward end being carried beneath and extended beyond said rear axle to admit of the unrestricted pivotal movement of said frame from a normal raised position close up against and substantially parallel with said supporting gear to an extended angular position therebeneath, and normally inactive wheels carried by said frame intermediately of its ends and about the axes of which said frame is adapted to rock when depressed to assist in bodily raising said supporting gear and hence said main wheels out of contact with the surface upon which the perambulator is supported.

In testimony whereof I hereunto affix my signature.

JOSEPH J. POWERS.